(12) United States Patent
Saha et al.

(10) Patent No.: US 12,470,687 B2
(45) Date of Patent: Nov. 11, 2025

(54) SYSTEM AND METHOD FOR CORRECTING A MAPPING DRIFT IN AN ELECTRONIC DEVICE

(71) Applicant: Samsung Electronics Co., Ltd., Suwon-si (KR)

(72) Inventors: Sujoy Saha, Bangalore (IN); Srikanth Sridhar, Bangalore (IN); Rajas Jayant Joshi, Bangalore (IN); Sarthak Sengupta, Bangalore (IN); Rajat Kumar Jain, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/999,276

(22) Filed: Dec. 23, 2024

(65) Prior Publication Data

US 2025/0220151 A1 Jul. 3, 2025

Related U.S. Application Data

(63) Continuation of application No. PCT/KR2024/020962, filed on Dec. 23, 2024.

(30) Foreign Application Priority Data

Dec. 28, 2023 (IN) .............................. 202341089489

(51) Int. Cl.
*H04N 13/271* (2018.01)
*G06T 7/73* (2017.01)
(Continued)

(52) U.S. Cl.
CPC ............ *H04N 13/327* (2018.05); *G06T 7/75* (2017.01); *H04N 13/128* (2018.05); *H04N 13/271* (2018.05); *G06T 2207/10028* (2013.01)

(58) Field of Classification Search
CPC ........ G06V 10/16; G06V 10/757; G06T 7/33; G06T 2207/10012; G06T 3/4038;
(Continued)

(56) References Cited

U.S. PATENT DOCUMENTS

| 2011/0002544 | A1* | 1/2011 | Oshima | ................ G06V 10/757 382/190 |
| 2019/0206116 | A1* | 7/2019 | Xu | ......................... G06T 15/205 |

(Continued)

FOREIGN PATENT DOCUMENTS

| CN | 111540013 A | 8/2020 |
| CN | 112991436 A | 6/2021 |

(Continued)

OTHER PUBLICATIONS

International Search Report dated Apr. 8, 2025, issued in International Patent Application No. PCT/KR2024/020962.

*Primary Examiner* — Nathnael Aynalem
(74) *Attorney, Agent, or Firm* — Jefferson IP Law, LLP

(57) ABSTRACT

A method performed by an electronic device for correcting a mapping drift is provided. The method includes receiving, by the electronic device via one or more primary cameras of the electronic device, a first plurality of images associated with a scene, extracting, by the electronic device, a plurality of first feature points from each of the received first plurality of images, receiving, by the electronic device via one or more secondary cameras of the electronic device, a second plurality of images, extracting, by the electronic device, a plurality of second feature points from each of the received second plurality of images, wherein a field of view of the one or more secondary cameras overlaps with a field of view of the one or more primary cameras, computing, by the electronic device, a mapping drift in a primary map associated with the first plurality of images by comparing position coordinates of the extracted plurality of first feature points (Continued)

with position coordinates of the extracted plurality of second feature points, and correcting, by the electronic device, the mapping drift in the primary map based on the computed mapping drift.

20 Claims, 14 Drawing Sheets

(51) Int. Cl.
*H04N 13/128* (2018.01)
*H04N 13/327* (2018.01)

(58) Field of Classification Search
CPC ......... G06T 19/006; G06T 2207/20221; G06T 2207/10016; G06T 2207/20212; G06T 2207/10028; G06T 2207/10021; G06T 2207/10024; G06T 7/75; H04N 13/128; H04N 13/271; H04N 13/327
USPC .......................................................... 348/51
See application file for complete search history.

(56) References Cited

U.S. PATENT DOCUMENTS

2019/0304133 A1 10/2019 Bang
2023/0177780 A1* 6/2023 Tao ....................... G06T 19/006
345/633

FOREIGN PATENT DOCUMENTS

| CN | 113506342 A | 10/2021 |
| CN | 113959435 A | 1/2022 |
| KR | 10-2022-0122471 A | 9/2022 |
| KR | 10-2549811 B1 | 6/2023 |
| KR | 10-2556355 B1 | 7/2023 |

* cited by examiner

SYSTEM AND METHOD FOR CORRECTING A MAPPING DRIFT IN AN ELECTRONIC DEVICE

CROSS-REFERENCE TO RELATED APPLICATION(S)

This application is a continuation application, claiming priority under § 365(c), of an International application No. PCT/KR2024/020962, filed on Dec. 23, 2024, which is based on and claims the benefit of an Indian Patent Application number 202341089489, filed on Dec. 28, 2023, in the Indian Patent Office, the disclosure of which is incorporated by reference herein in its entirety.

FIELD OF THE INVENTION

The disclosure relates to a mapping drift correction. More particularly, the disclosure relates to a system and a method for correcting a mapping drift in an electronic device.

BACKGROUND

Augmented Reality (AR) and Virtual Reality (VR) have emerged as transformative technologies, reshaping the way we perceive and interact with the digital world. With the emergence of AR and VR, variety of use-cases are under-development to provide users with ability to easily navigate, pin tasks, interact with objects, draw in AR, and the like. All these use-cases require building accurate three-dimensional (3D) maps which are used for re-localization later. Errors in computation of landmarks and time varying bias in Inertial Measurement Unit (IMU) may lead to accumulation of errors. For example, visual error in pose estimation may be due to the accumulation of errors in an inertial sensor in landmark estimation, time varying accelerometer and gyroscope bias, and non-linear optimization. This accumulation of errors can lead to errors in pose estimation in Simultaneous Localization and Mapping (SLAM) techniques. This phenomenon is called as drift. There are multiple conventional techniques to correct the drift. For example, one of the conventional techniques to correct drift is by closing the loop. Loop closing involves revisiting previously visited areas. Since the user knows through visual sensors which previously mapped area are visited, accordingly, the user can correct the error in pose estimation by distributing the error across the graph called as pose-graph optimization. Many a times, especially while using AR/VR headsets in consumer settings, the user may not have the patience/scope of revisiting the previously mapped regions or it might be physically not possible to move to previously mapped regions. As a result, accumulation of drift may be caused in the 3D map which can lead to inaccuracies in pose-estimation.

FIG. 1A illustrates a schematic representation depicting the process of loop detection, according to the related art.

In the conventional technique, it is checked if there is a similar key frame in a database. This checking requires a global descriptor to be matched with all the existing key frames in the database. Generally, bag of words-based approach is used for their efficiency. At 102, two-dimensional (2D)-2D matches are obtained between the key points in the loop candidate 104 (key frame in database) and key points of the query frame 106. Each 2D point in the key frame is associated with a corresponding 3D landmark. After obtaining the 2D-2D matches between the loop candidate 104 and the query frame 106, 3D-3D associations are obtained at 108. The drift or error in the pose estimation is obtained by minimizing the error between the 3D locations by optimizing for the pose of the query frame 106. Further, new 3D-2D matches 110 are illustrated.

FIGS. 1B and 1C illustrate a schematic representation depicting the process of loop correction, according to the related art.

Referring to FIG. 1B, a corrected map 112 is illustrated. After optimizing the pose of the query frame 106 (shown in FIG. 1A), the process of map merging is carried out. Existing landmark positions are corrected based on the optimized pose. Updated landmarks 114 corrected based on the optimized pose is illustrated. Further, if new 3D landmarks 116 are detected, then the new 3D landmarks 116 are added to the existing map.

Once the loop correction is done, the error is then distributed across the graph. The nodes inside the graph are the individual key frames and the edges are the relative pose between the key frames. During optimization, the loop key frame and the corrected query key frame are fixed and the other key frames inside the graph are then optimized. In case of a monocular SLAM, full 7 Degrees of Freedom (DoF) pose graph optimization is carried out. However, in case of Visual Inertial SLAM, 4 DoF pose graph optimization is performed. As a result, fully observable roll and pitch angles are rendered.

Furthermore, referring to FIG. 1C, a camera pair 118 and an IMU 120. The conventional solution 122 uses the inputs from the camera pair 118 and the IMU 120 for tracking from points A to B, at step 124. Drift accumulates while tracking from point A to point B. The conventional solution 122 requires the user to revisit the previously tracked area (in this case point A) to execute loop correction. As a result, the drift is corrected at step 126. Closing the loop is not always possible due to physical limitations in the scene. As a result, the user might end the mapping session abruptly without revisiting the previously mapped areas. Also, important visual features might not be mapped due to the presence of dynamic objects in the scene.

Accordingly, there lies a need for a technique and method that can overcome each of the above-identified problems and limitations associated with the conventional solutions.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and a method for correcting a mapping drift in an electronic device.

Additional aspects will be set forth in part in the description which follows and, in part, will be apparent from the description, or may be learned by practice of the presented embodiments.

In accordance with an aspect of the disclosure, a method for correcting a mapping drift in an electronic device is provided. The method includes receiving, by the electronic device via one or more primary cameras of the electronic device, a first plurality of images associated with a scene, extracting, by the electronic device, a plurality of first feature points from each of the received first plurality of images, receiving, by the electronic device via one or more secondary cameras of the electronic device, a second plurality of images upon extracting the plurality of first feature points, extracting, by the electronic device, a plurality of second feature points from each of the received second plurality of images, wherein a field of view of the one or more secondary cameras overlaps with a field of view of the one or more primary cameras, and computing, by the electronic device, a mapping drift in a primary map associated with the first plurality of images by comparing position coordinates of the extracted plurality of first feature points with position coordinates of the extracted plurality of second feature points. Further, the method includes correcting the mapping drift in the primary map based on the computed mapping drift.

In accordance with another aspect of the disclosure, an electronic device for correcting a mapping drift is provided. The electronic device includes one or more primary cameras, memory storing one or more computer programs and one or more processors communicably coupled to the one or more primary cameras and the memory, wherein the one or more computer programs include computer-executable instructions that, when executed by one or more processors individually or collectively, cause the electronic device to receive, via the one or more primary cameras of the electronic device, a first plurality of images associated with a scene, extract a plurality of first feature points from each of the received first plurality of images, receive, via one or more secondary cameras of the electronic device, a second plurality of images upon extracting the plurality of first feature points, extract a plurality of second feature points from each of the received second plurality of images, wherein a field of view of the one or more secondary cameras overlaps with a field of view of the one or more primary cameras, compute a mapping drift in a primary map associated with the first plurality of images by comparing position coordinates of the extracted plurality of first feature points with position coordinates of the extracted plurality of second feature points, and correct the mapping drift in the primary map based on the computed mapping drift.

In accordance with another aspect of the disclosure, one or more non-transitory computer-readable storage media storing one or more computer programs including computer-executable instructions that, when executed by one or more processors of an electronic device individually or collectively, cause the electronic device to perform operations are provided. The operations include receiving, by the electronic device via one or more primary cameras, a first plurality of images associated with a scene, extracting, by the electronic device, a plurality of first feature points from each of the received first plurality of images, receiving by the electronic device, via one or more secondary cameras of the electronic device, a second plurality of images upon extracting the plurality of first feature points, extracting, by the electronic device, a plurality of second feature points from each of the received second plurality of images, wherein a field of view of the one or more secondary cameras overlaps with a field of view of the one or more primary cameras, computing, by the electronic device, a mapping drift in a primary map associated with the first plurality of images by comparing position coordinates of the extracted plurality of first feature points with position coordinates of the extracted plurality of second feature points, and correcting, by the electronic device, the mapping drift in the primary map based on the computed mapping drift.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
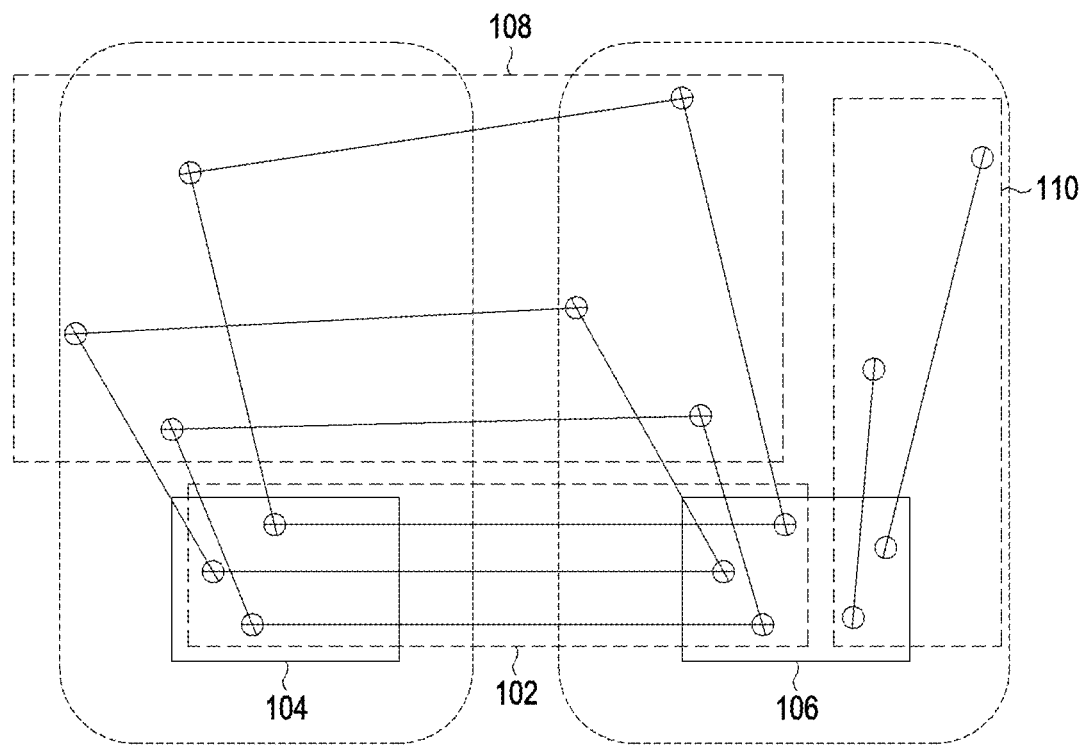
FIG. 1A illustrates a schematic representation depicting the process of loop detection, according to the related art.
Figure 1B:
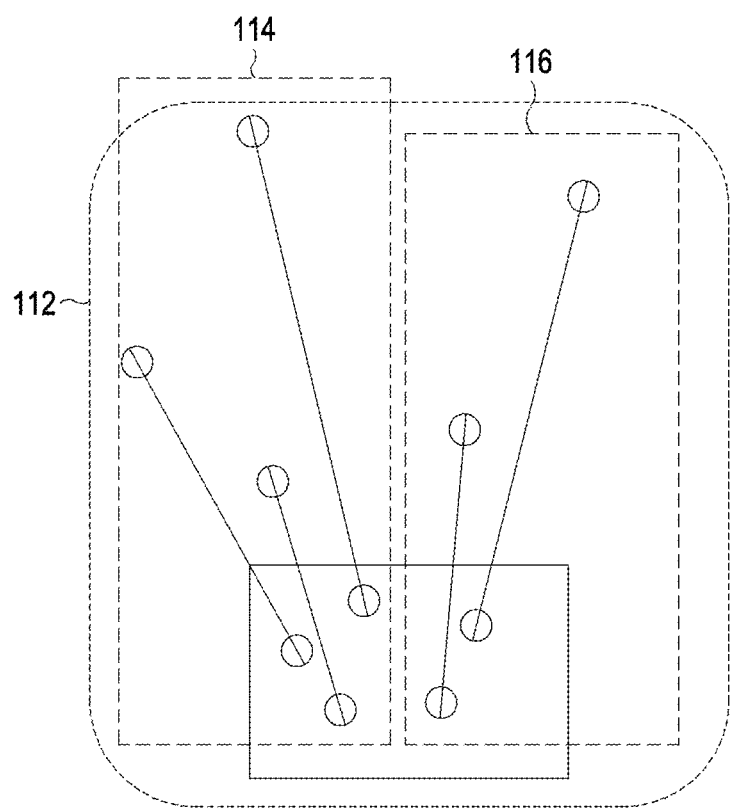
FIGS. 1B and 1C illustrate schematic representations depicting the process of loop correction, according to the related art.
Figure 1C:
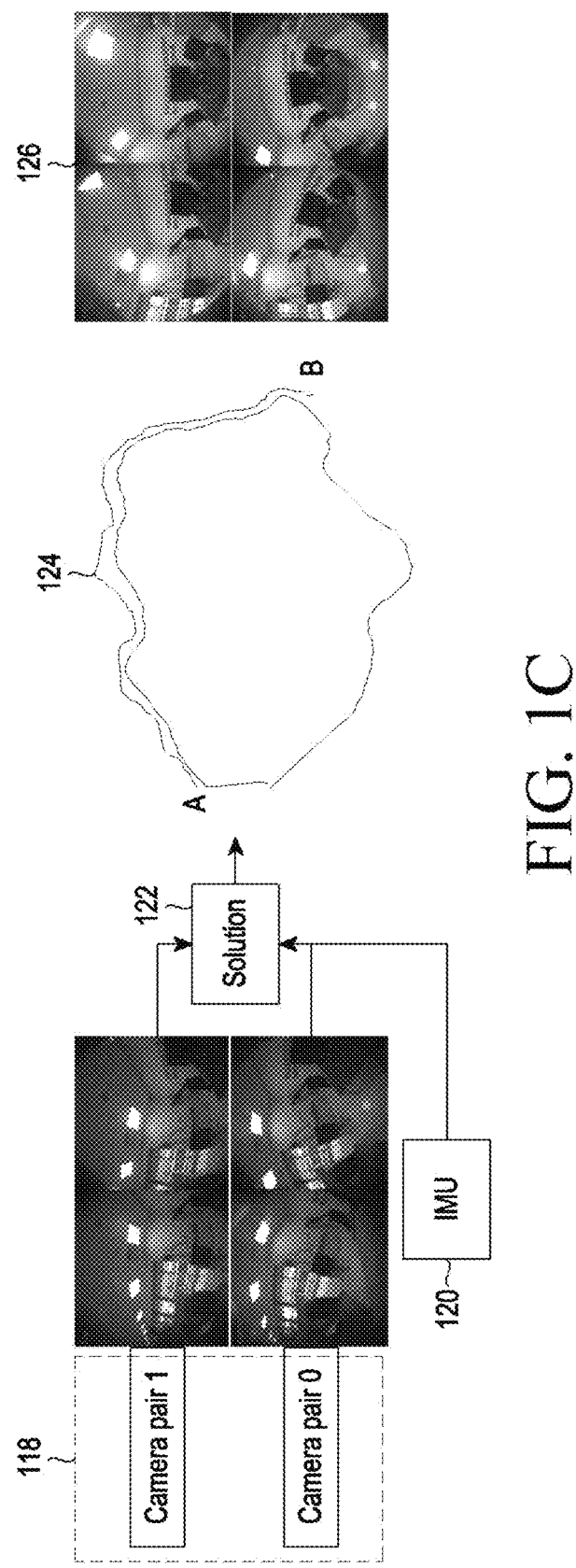

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 2:
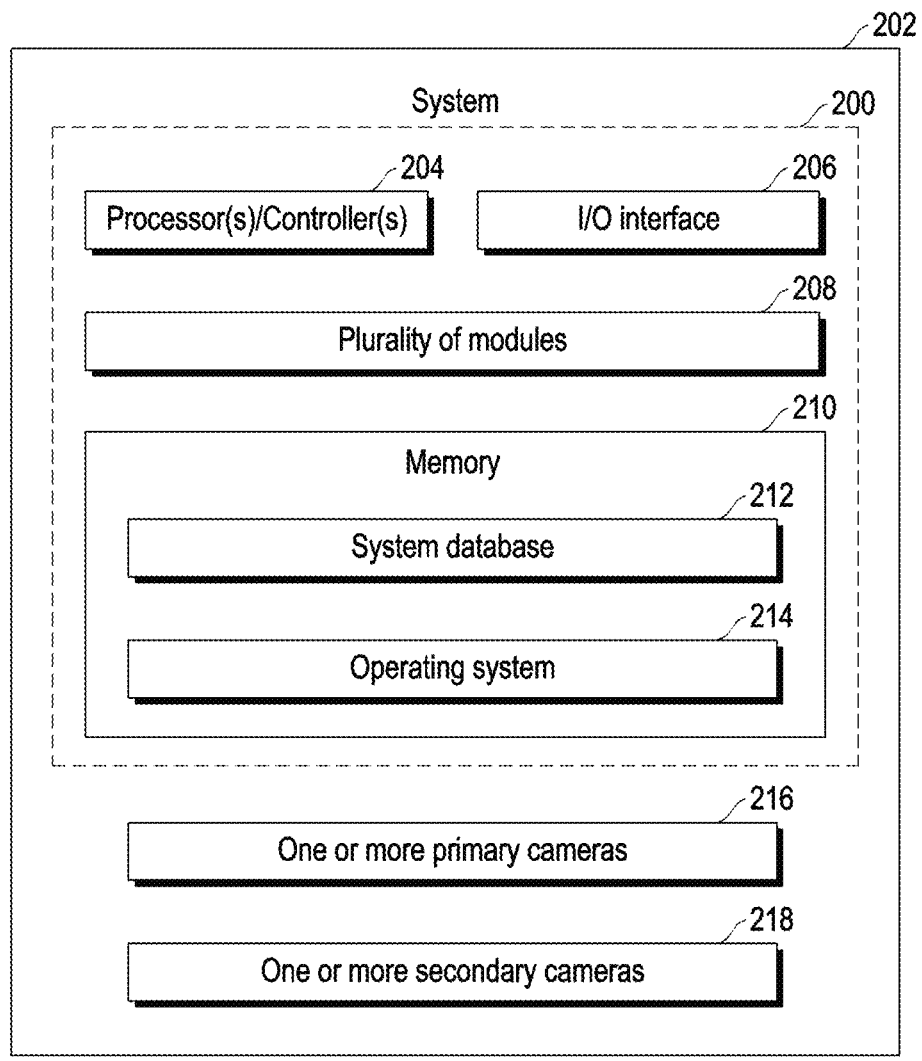
FIG. 2 illustrates a block diagram of a system for correcting a mapping drift in an electronic device, according to an embodiment of the disclosure.

FIG. 2 illustrates a block diagram of a system 200 for correcting a mapping drift in an electronic device 202, according to an embodiment of the disclosure.

Referring to FIG. 2, the system 200 is implemented in the electronic device 202, such as an Augmented Reality (AR) headset, a Virtual Reality (VR) headset, a smartphone, a wearable device, a Head Mounted Unit (HMU), and the like. In an embodiment of the disclosure, the mapping drift corresponds to the accumulation of errors or inaccuracies in the estimated pose of an object or camera over time as it moves through a scene. Pose estimation involves determining the position and orientation (pose) of an object or camera relative to its surroundings.

The system 200 may include one or more processors/controllers 204, an Input/Output (I/O) interface 206, a plurality of modules 208, and memory 210.

In an embodiment, one or more processors/controllers 204 may be operatively coupled to each of the respective I/O interface 206, the plurality of modules 208, and the memory 210. In one embodiment, one or more processors/controllers 204 may include at least one data processor for executing processes in a Virtual Storage Area Network. The one or more processors/controllers 204 may include specialized processing units such as integrated system (bus) controllers, memory management control units, floating point units, graphics processing units, digital signal processing units, etc. In one embodiment, the one or more processors/controllers 204 may include a Central Processing Unit (CPU), a Graphics Processing Unit (GPU), or both. The one or more processors/controllers 204 may be one or more general processors, digital signal processors, application-specific integrated circuits, field-programmable gate arrays, servers, networks, digital circuits, analog circuits, combinations thereof, or other now known or later developed devices for analyzing and processing data. The one or more processors/controllers 204 may execute a software program, such as code generated manually (i.e., programmed) to perform the desired operation. In an embodiment of the disclosure, the processors/controllers 204 may be a general-purpose processor, such as the CPU, an Application Processor (AP), or the like, a graphics-only processing unit such as the GPU, a Visual Processing Unit (VPU), and/or an Artificial Intelligence (AI)-dedicated processor, such as a Neural Processing Unit (NPU).

Further, the one or more processors/controllers 204 control the processing of input data in accordance with a predefined operating rule or machine learning (ML) model stored in the non-volatile memory and the volatile memory. The predefined operating rule or the ML model is provided through training or learning.

Here, being provided through learning means that, by applying a learning technique to a plurality of learning data, a predefined operating rule or the ML model of a desired characteristic is made. The learning may be performed in the electronic device 202 itself in which ML according to an embodiment is performed, and/or may be implemented through a separate server/system.

Furthermore, the ML model may consist of a plurality of neural network layers. Each layer has a plurality of weight values and performs a layer operation through the calculation of a previous layer and an operation of a plurality of weights. Examples of neural networks include but are not limited to, Convolutional Neural Networks (CNN), Deep Neural Networks (DNN), Recurrent Neural Networks (RNN), Restricted Boltzmann Machine (RBM), Deep Belief Networks (DBN), Bidirectional Recurrent Deep Neural Network (BRDNN), Generative Adversarial Networks (GAN), and deep Q-network.

The learning technique is a method for training a predetermined target device (e.g., a robot) using a plurality of learning data to cause, allow, or control the target device to decide or predict. Examples of learning techniques include, but are not limited to, supervised learning, unsupervised learning, semi-supervised learning, or reinforcement learning.

The one or more processors/controllers 204 may be disposed in communication with one or more input/output (I/O) devices via the respective I/O interface 206. The I/O interface 206 may employ communication code-division multiple access (CDMA), high-speed packet access (HSPA+), global system for mobile communications (GSM), long-term evolution (LTE), worldwide interoperability for microwave access (WiMax), or the like, etc.

The one or more processors/controllers 204 may be disposed of in communication with a communication network via a network interface. In an embodiment, the network interface may be the I/O interface 206. The network interface may connect to the communication network to enable the connection of the electronic device 202 with the other devices. The network interface may employ connection protocols including, without limitation, direct connect, Ethernet (e.g., twisted pair 10/100/1000 Base T), transmission control protocol/internet protocol (TCP/IP), token ring, Institute of Electrical and Electronics Engineers (IEEE) 802.11a/b/g/n/x, etc. The communication network may include, without limitation, a direct interconnection, local area network (LAN), wide area network (WAN), wireless network (e.g., using Wireless Application Protocol), the Internet, and the like.

In some embodiments, the memory 210 may be communicatively coupled to the one or more processors/controllers 204. The memory 210 may be configured to store data, and instructions executable by the one or more processors/controllers 204. The memory 210 may include but is not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 210 may include a cache or random-access memory for the one or more processors/controllers 204. In alternative examples, the memory 210 may be a part of the one or more processors/controllers 204, such as a cache memory of a processor, the system memory, or other memory. In some embodiments, the memory 210 may be an external storage device or database for storing data. The memory 210 may be operable to store instructions executable by the one or more processors/controllers 204. The functions, acts, or tasks illustrated in the figures or described may be performed by the programmed processor/controller for executing the instructions stored in the memory 210. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

In some embodiments, the plurality of module 208 may be included within the memory 210. The memory 210 may further include a system database 212 to store data. The plurality of modules 208 may include a set of instructions that may be executed to cause the system 200 to perform any one or more of the methods/processes disclosed herein. The plurality of modules 208 may be configured to perform the steps of the disclosure using the data stored in the system database 212 for correcting the mapping drift in the electronic device 202, as discussed herein. In an embodiment, each of the plurality of modules 208 may be a hardware unit that may be outside the memory 210. Further, the memory 210 may include an operating system 214 for performing one or more tasks of the system 200, as performed by a generic operating system 214 in the communications domain. In one embodiment, the database 212 may be configured to store the information as required by the plurality of modules 208 and the one or more processors/controllers 204 for correcting the mapping drift in the electronic device 202.

In an embodiment of the disclosure, at least one of the plurality of modules 208 may be implemented through the ML model. A function associated with the ML may be performed through the non-volatile memory, the volatile memory, and the one or more processors 204.

In an embodiment, the I/O interface 206 may enable input and output to and from the system 200 using suitable devices such as, but not limited to, a display, a keyboard, a mouse, a touch screen, a microphone, a speaker, and so forth.

Further, the electronic device 202 includes one or more primary cameras 216 and one or more secondary cameras 218. Details on the one or more primary cameras 216 and one or more secondary cameras 218 have been elaborated in subsequent paragraphs of the description.

Further, the disclosure also contemplates a computer-readable medium that includes instructions or receives and executes instructions responsive to a propagated signal. Further, the instructions may be transmitted or received over the network via a communication port or interface or using a bus (not shown). The communication port or interface may be a part of the one or more processors/controllers 204 or may be a separate component. The communication port may be created in software or may be a physical connection in hardware. The communication port may be configured to connect with a network, external media, the display, or any other components in the electronic device 202, or combinations thereof. The connection with the network may be a physical connection, such as a wired Ethernet connection, or may be established wirelessly. Likewise, the additional connections with other components of the electronic device 202 may be physical or may be established wirelessly. The network may alternatively be directly connected to the bus. For the sake of brevity, the architecture and standard operations of the operating system 214, the memory 210, the system database 212, the one or more processors/controllers 204, and the I/O interface 206 are not discussed in detail.

Figure 3:
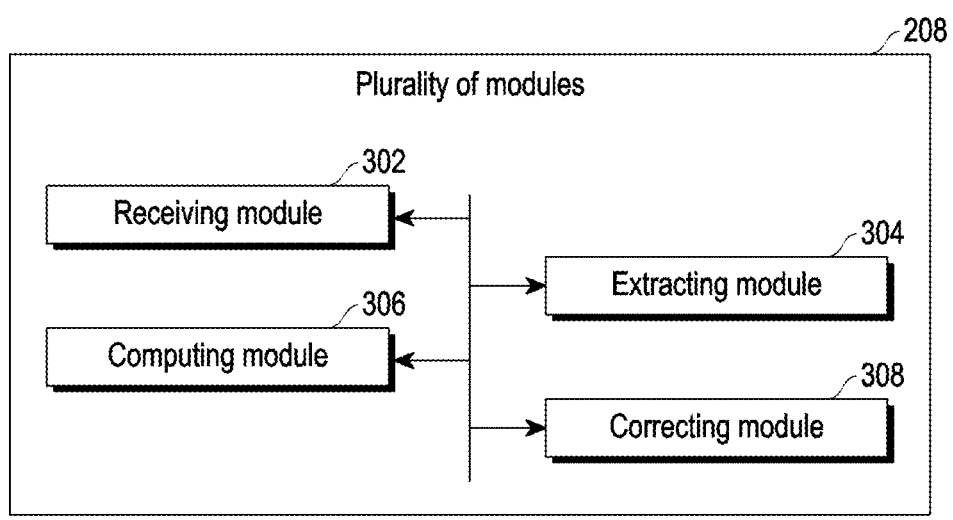
FIG. 3 illustrates a block diagram of a plurality of modules of the system shown in FIG. 2, according to an embodiment of the disclosure.

FIG. 3 illustrates a block diagram of a plurality of modules of a system shown in FIG. 2, according to an embodiment of the disclosure.

Referring to FIG. 3, in the system 200, the plurality of modules 208 may include but is not limited to, a receiving module 302, an extracting module 304, a computing module 306, and a correcting module 308. The plurality of modules 208 may be implemented by way of suitable hardware and/or software applications.

In an embodiment of the disclosure, the receiving module 302 may be configured to receive, via one or more primary cameras 216 of the electronic device 202, a first plurality of images associated with a scene. In an embodiment of the disclosure, the one or more primary cameras 216 are one or more Simultaneous Localization and Mapping (SLAM) cameras.

Further, a generating module may be configured to generate the primary map based on the received first plurality of images. In an embodiment of the disclosure, primary map in the plurality of images refers to a representation or visualization of certain information derived from the image, such as spatial relationships, features, or attributes that convey meaningful details about the scene captured in the plurality of images.

Furthermore, the extracting module 304 may be configured to extract a plurality of first feature points from each of the received first plurality of images.

The receiving module 302 may be configured to receive, via one or more secondary cameras 218 of the electronic device 202, a second plurality of images upon extracting the plurality of first feature points. In an embodiment of the disclosure, the one or more secondary cameras 218 are one or more hand tracking cameras.

Further, the generating module may be configured to generate a secondary map based on the received second plurality of images. In an embodiment of the disclosure, a map consists of 3D points and a set of key frames. The set of key frames are a subset of frames succinctly representing the scene. The primary map is generated using the primary cameras and the secondary map is generated by the secondary cameras which are reinitialized periodically.

Furthermore, the extracting module 304 may be configured to extract a plurality of second feature points from each of the received second plurality of images. In an embodiment of the disclosure, a field of view of the one or more secondary cameras 218 overlaps with a field of view of the one or more primary cameras 216.

Further, the computing module 306 may be configured to compute a mapping drift in a primary map associated with the first plurality of images by comparing position coordinates of the extracted plurality of first feature points with position coordinates of the extracted plurality of second feature points. In computing the mapping drift in the primary map, the computing module 306 may be configured to identify a first relation based on a comparison of a first set of two-dimensional (2D) position coordinates of the extracted plurality of first feature points with a second set of 2D position coordinates of the extracted plurality of second feature points. Further, the computing module 306 may be configured to identify a second relation between a first set of 3D position coordinates of the extracted plurality of first feature points and a second set of 3D position coordinates of the extracted plurality of second feature points based on the first relation. The computing module 306 may be configured to calculate a difference between the first set of 3D position coordinates and the second set of 3D position coordinates based on the second relation. The computing module 306 may also be configured to compute the mapping drift in the primary map based on the calculated difference between the first set of 3D position coordinates and the second set of 3D position coordinates.

Furthermore, the correcting module 308 may be configured to correct the mapping drift in the primary map based on the computed mapping drift. In correcting the mapping drift in the primary map, the correcting module 308 may be configured to update, for correcting the mapping drift in the primary map, the position of the first set of 3D position coordinates based on the position of the second set of 3D position coordinates and the computed mapping drift in the primary map. In an embodiment of the disclosure, the mapping drift is corrected for each of the first plurality of images. The correcting module establishes the relationship between the images in the primary map with those of the secondary map. For example, the correcting module 308 updates the connection between the primary map and the secondary map. Details on the connection is elaborated with the help of an example by using FIG. 4A.

In an embodiment of the disclosure, the one or more secondary cameras 218 are reinitialized periodically for the scene.

Before capturing the first plurality of images and the second plurality of images, the system 200 estimates the initial state of a pair of visual inertial sensors. For example, the system 200 estimates the velocity, gravity and bias of the gyroscope and accelerometer.

In an embodiment of the disclosure, after the required loop connections are satisfied, the secondary map is merged with the primary map. In an embodiment of the disclosure, the initial pose is refined using bundle adjustment. The refinement of the initial pose involves projecting the 3D landmarks and optimizing the pose while reducing the reprojection error.

Further, the computing module 306 may be configured to receive, via the one or more secondary cameras 218, a plurality of additional images associated with the scene. In an embodiment of the disclosure, the plurality of additional images are other than the first plurality of images associated with the scene. Further, the computing module 306 may be configured to extract a plurality of additional feature points from each of the received plurality of additional images. The computing module 306 may be configured to compute a mapping drift in the primary map associated with the first plurality of images by comparing position coordinates of the extracted plurality of first feature points with position coordinates of the extracted plurality of second feature points and the extracted plurality of additional images. The operation of the system 200 has been elaborated in subsequent paragraphs at least with reference to FIGS. 4A, 4B, 5 to 7, 8A, 8B, and 10.

Figure 4A:
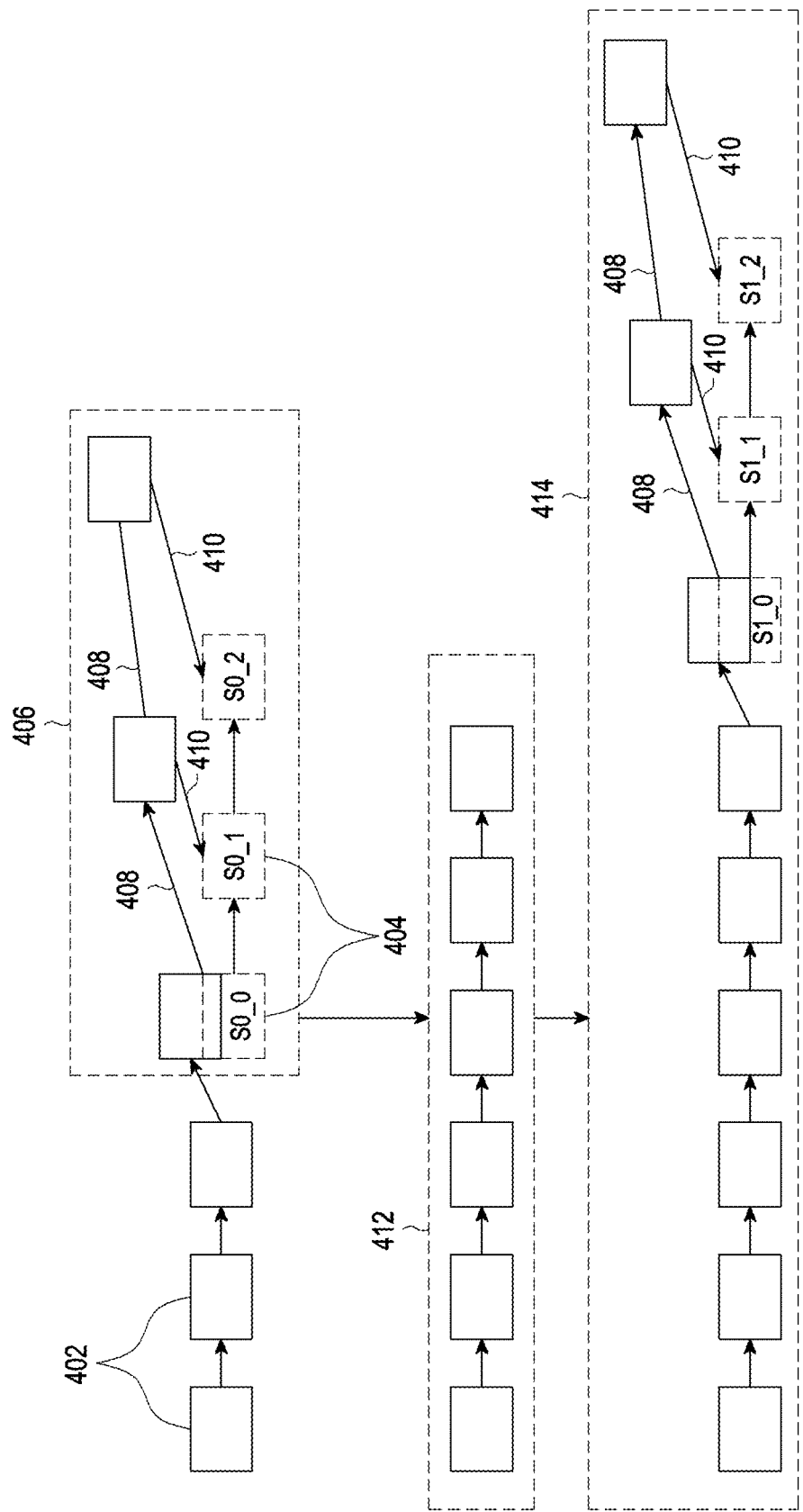
FIGS. 4A and 4B illustrate schematic representations depicting the process of correcting the mapping drift, according to various embodiments of the disclosure.
Figure 4B:
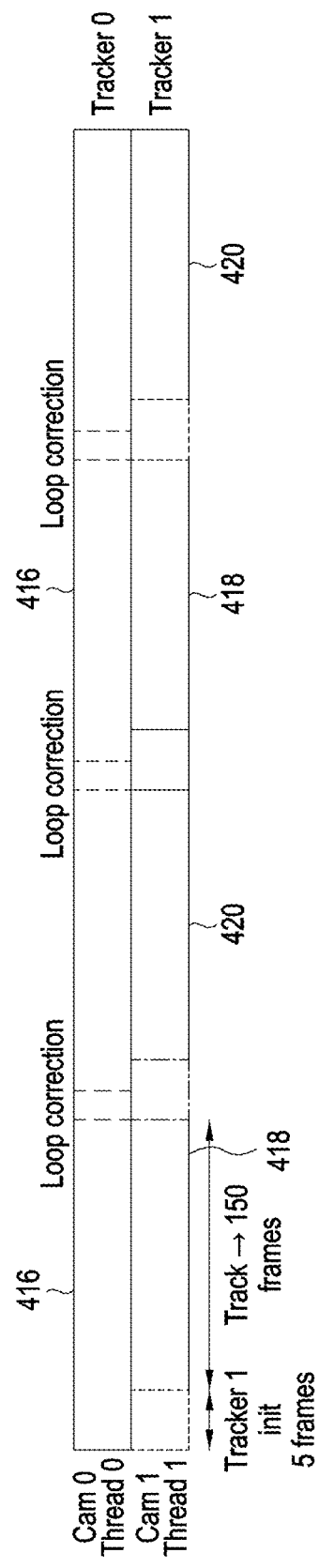

FIGS. 4A and 4B illustrate schematic representations depicting the process of correcting the mapping drift, according to various embodiments of the disclosure. For the sake of brevity, FIGS. 4A and 4B have been explained together. The details on correcting the mapping drift have been explained in detail with reference to FIG. 3.

Referring to FIG. 4A, keyframes 402 of the primary map are illustrated. Further, key frames 404 of the secondary map are illustrated. At step 406, the drift starts to accumulate in the primary map. In an embodiment of the disclosure, some key frames of the secondary map overlap with frames of the primary map. Further, a sequential edge 408 and a loop correction 410 are illustrated.

Further, at step 412, the system 200 performs the loop correction of the primary map. Furthermore, a next iteration 414 is illustrated. As shown, the drift starts to accumulate in the primary map. As a result, the system 200 initializes the new secondary map associated with the one or more secondary cameras 218. Further, the system 200 performs the loop correction/pose graph optimization for the next iteration.

As explained with reference to FIG. 3, FIG. 4A gives a high-level overview of the drift correction process. It involves updating connections between the images in the primary map with those of the secondary map. These connections are shown by 408 and 410. The connections give position and orientation of the images in the secondary map with those of the primary map.

Referring to FIG. 4B, a tracker 416 associated with the one or more primary cameras 216, a tracker 418 associated with the one or more secondary cameras 218, and a tracker 420 associated with one or more reinitialized secondary cameras are illustrated. In an embodiment of the disclosure, the one or more reinitialized secondary cameras correspond to the one or more secondary cameras 218 which are reinitialized for the scene. As shown, for thread 0, the tracker 416 runs uninterrupted. The tracker 416 outputs pose at 30 fps at all times. The tracker 418 for the one or more secondary cameras 218 runs on a separate thread. In an embodiment of the disclosure, the tracker 418 runs until the minimum required number of loop connections with the tracker 418 are established. The tracker 418 then re-initializes to repeat the process. While thread 1 is running, the thread 0 outputs pose uninterrupted at 30 fps. As a result, the tracker 416 is not affected. In an embodiment of the disclosure, the loop correction/pose graph optimization i.e., map correction can happen on a separate parallel thread by using the tracker 420.

Figure 5:
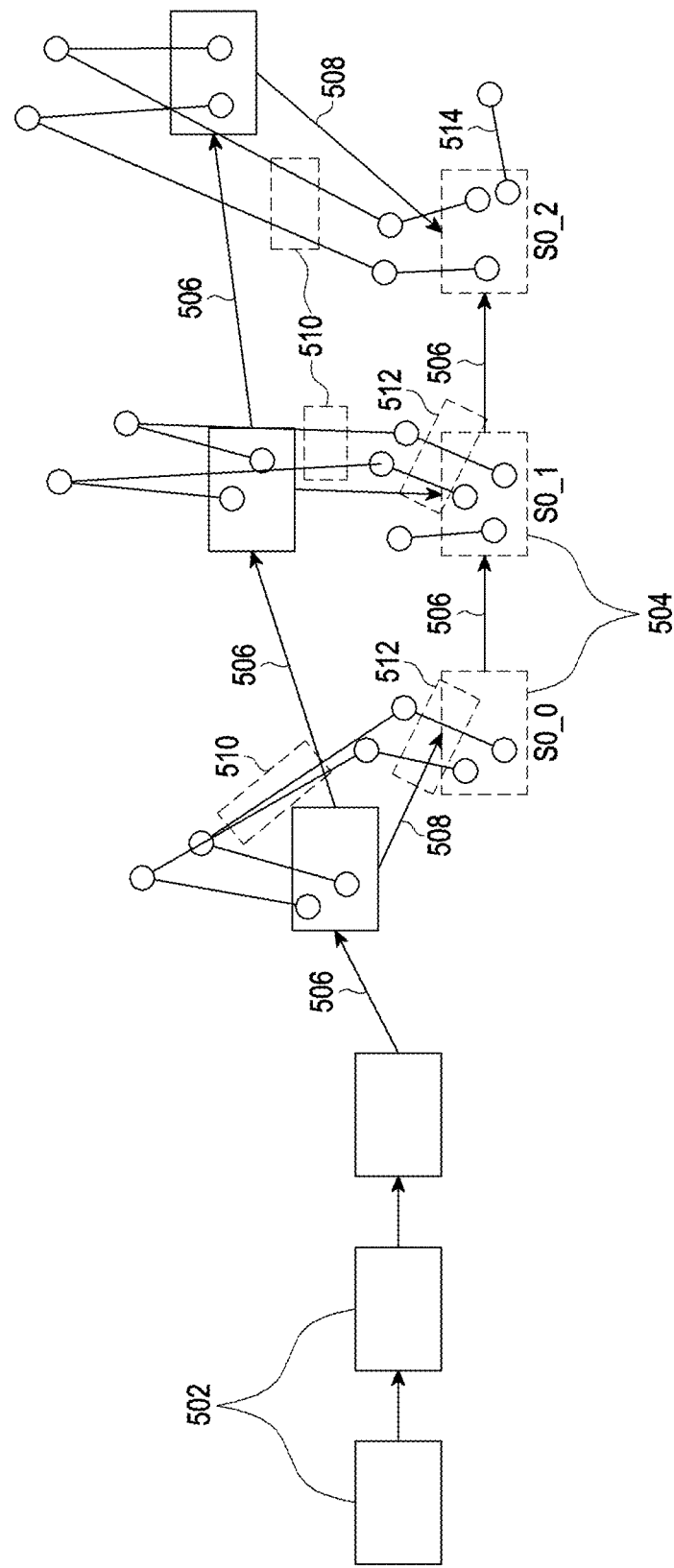
FIG. 5 illustrates a schematic representation depicting the process of loop detection and localization, according to an embodiment of the disclosure.

FIG. 5 illustrates a schematic representation depicting the process of loop detection and localization, according to an embodiment of the disclosure.

Referring to FIG. 5, keyframes 502 of the primary map and keyframes 504 of the secondary map are illustrated. In an embodiment of the disclosure, the system 200 may establish the loop connections between the keyframes 502 of the main tracker and the secondary map. Further, a sequential edge 506 and a loop connection 508 are illustrated. Furthermore, a 3D-3D mapping 510 i.e., the second relation, a 3D and 2D mapping 512, and a 3D and 2D mapping 514 associated with the plurality of additional images are illustrated. In an embodiment of the disclosure, the 3D and 2D mapping represents the location of the 3D point when projected to 2D space and vice-versa. The 3D-2D mapping/associations are stored while building the map.

In an embodiment of the disclosure, the 2D-2D and subsequent 2D-3D correspondences are then established. The system 200 then optimizes the pose of the primary's key frames 502 by fixing the secondary map's key frames 504. During this process, new landmarks associated with the plurality of additional images are added. In an embodiment of the disclosure, the new landmarks are observed only by the one or more secondary camera's tracker. The additional submap associated with the plurality of additional images is added to the bundle adjustment which optimizes the key frame poses and landmarks as given by Equation 1:

$$\sum_{(l,s)} \left( \left\| r_c\left(\overline{z}_s^l, X, \overline{q}_s^l, \overline{p}_s^l\right) \right\|^2 \right) \quad \text{Equation 1}$$

The terms $\overline{z}_s^l$ is the observed measurement of the secondary map's key points, X is the current state and the $q_s^l$ and $p_s^l$ represent the fixed rotation and position of the key frames 502.

Figure 6:
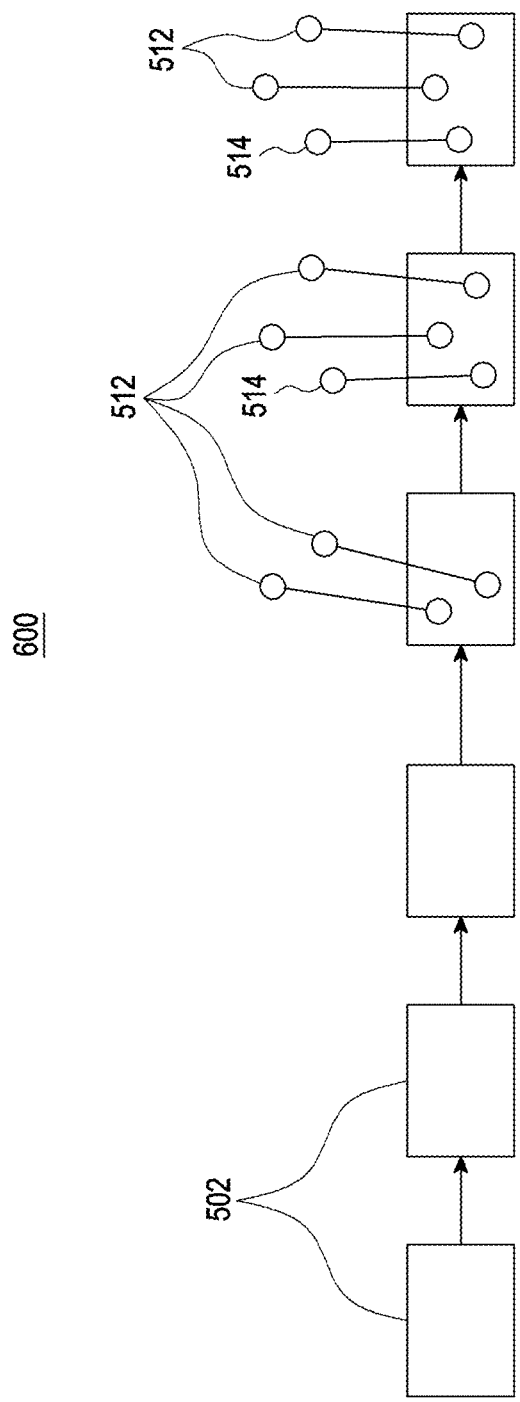
FIG. 6 illustrates a schematic representation depicting the process of correcting the mapping drift, according to an embodiment of the disclosure.

FIG. 6 illustrates a schematic representation depicting the process of correcting the mapping drift, according to an embodiment of the disclosure. The details on correcting the mapping drift have been explained in detail with reference to FIG. 3.

Referring to FIGS. 5 and 6, a drift corrected primary map 600, keyframes 502 of the primary map, a 3D and 2D mapping 512, and a 3D and 2D mapping 514 associated with the plurality of additional images are illustrated.

In an embodiment of the disclosure, a greater number of loop constraints makes the optimization more accurate. As the one or more secondary cameras 218 with overlapping field of view are used by the system 200, more loop constraints are obtained which helps in more accurate drift correction. To correct the whole of the primary map and to distribute the drift across the graph, the system 200 minimizes the cost function given by Equation 2

$$\left\{ \sum_{(i,j) \in seq} \|r_{i,j}\|^2 + \sum_{(i,j) \in submap} \|r_{i,j}\|^2 \right\} \quad \text{Equation 2}$$

The nodes are the individual key frame's poses, and the edges are the relative pose between the primary map's key frames and the secondary map's key frames. The pose of the secondary map's key frames is fixed, and the poses of the primary map's key frames poses are optimized.

Figure 7:
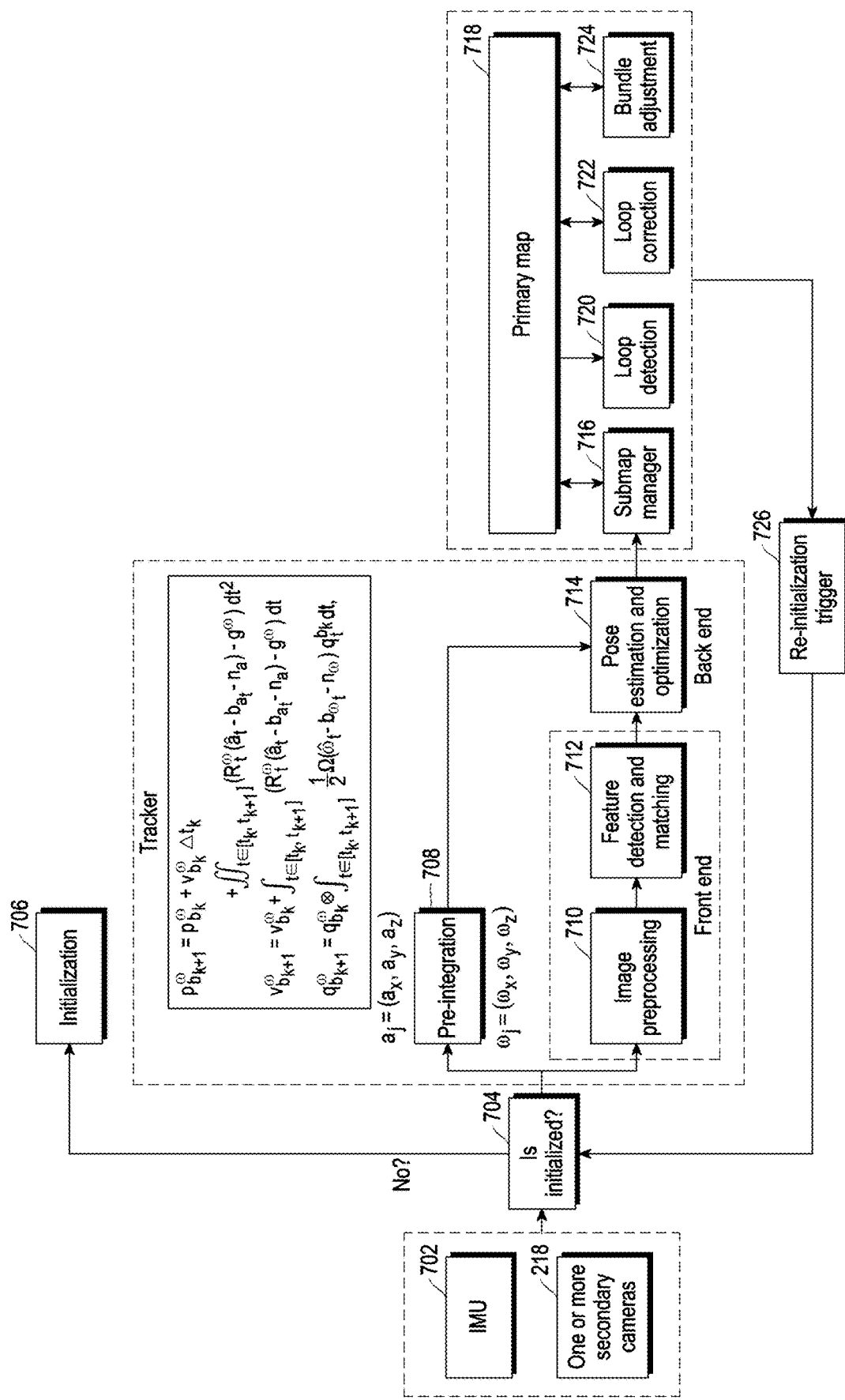
FIG. 7 illustrates a block diagram depicting an operation of the system for correcting the mapping drift in the electronic device, according to an embodiment of the disclosure.

FIG. 7 illustrates a block diagram depicting an operation of the system 200 for correcting the mapping drift in the electronic device 202, according to an embodiment of the disclosure. The details on correcting the mapping drift by the system 200 have been explained in detail with reference to FIG. 3.

Referring to FIG. 7, at step 704, it is determined if IMU 702 and the one or more secondary cameras 218 are initialized. If the output of step 704 is 'no', the IMU 702 and the one or more secondary cameras 218 are initialized, at step 706. At step 706, the system 200 deals with the estimation of the initial state of the IMU 702 and the one or more secondary sensors. The step 706 also involves the estimation of the velocity, gravity and bias of a gyroscope and an accelerometer of the IMU 702.

Further, the system 200 performs the pre-integration 708 and image preprocessing 710. The IMU provides instantaneous angular velocity and linear acceleration of the electronic device 202. In the pre-integration 708, the system 200 integrates multiple inertial measurements into a single relative motion constraint between two frames. The measurements are made with respect to a local frame such that it avoids the need to perform repeated integrations during optimization. In the image preprocessing 710 step, the system prepares the image for feature detection and matching. The image preprocessing 710 involves applying filtering techniques on the image to reduce noise and as a result detect effective feature for further downstream tasks such feature matching. At step 712, the system 200 performs the feature detection and matching process. At step 712, the system 200 extracts trackable features in a frame and matches these features with previous frames. Furthermore, at step 714, the system 200 performs the pose estimation and optimization. At step 714, the system 200 uses the pose from the pre-integration 708. The initial pose is then refined using bundle adjustment. The bundle adjustment involves projecting the 3D landmarks and optimizing the pose while reducing the reprojection error.

Furthermore, at step 716, the system 200 performs the map management. In the map management, the system 200 manages the overall communication between the primary map 718 and the submap. Also, at step 716, the system 200 updates the connection between the secondary map and the primary map 718. At step 720, the system 200 performs the loop detection/drift error detection. In the loop detection, the system 200 obtains the secondary map frames' global descriptor and matches it with that of the database of all key frames in the primary map. In an embodiment of the disclosure, the global descriptor is a 1-Dimensional vector which effectively represents the image being matched. This global descriptor is then used to efficiently compare the similarity of the query image with all the images in the database. Once the closest image is found from the database, the global descriptor then establishes connections between the loop candidate key frame (closest match in the database) and the secondary map's key frame. Further, at step 722, the system 200 performs the loop correction/drift error correction. In the loop correction, the system 200 obtains the transformation between the secondary map's current key frame and the loop candidate key frame in the primary map. Once the loop key frame is corrected, it is then fixed during optimization. The nodes in the graph are the key frame poses and the edges are the relative poses. The system 200 then begins optimization by distributing the error across the entire graph in the primary map. This process is called the pose graph optimization.

Further, at step 724, the system 200 uses the bundle adjustment to optimize the reprojection error for each landmark. It is a non-linear optimization by jointly modifying the landmark positions as well as the keyframe poses. The key frames' poses in the secondary map are fixed and the key frames in the primary map are optimized. Along with the key frame poses, the landmark locations are also updated in the primary map. It also adds new landmarks which are only observed by the one or more secondary camera's tracker thereby augmenting the primary map.

At step 726, the system 200 performs the re-initialization trigger. In the re-initializing trigger, once the required number of loop connections are obtained and the loop detection and correction have been successfully completed, the parallel tracker associated with the one or more secondary cameras 218 is terminated and the entire process is repeated starting from initialization. The loop update is represented by using Equation 3:

$$P_j^{loopUpdate} \in \{X'_j, Y'_j, Z'_j, Q'_{xj}, Q'_{yj}, Q'_{zj}, Q'_{wj}\}; j \in \text{all\_keyframes} \quad \text{Equation 3}$$

The pose of the keyframe consists of the position and orientation with respect to origin. Here the terms $X'_j, Y'_j, Z'_j$ gives the 3-Dimensional position of the keyframe in X, Y and Z axis respectively. The orientation of the keyframe with respect to origin is represented in quaternion form $Q'_{xj}, Q'_{yj}, Q'_{zj}, Q'_{wj}$ FIG. 8A illustrates a schematic representation depicting a front view of an electronic device implementing a system, according to an embodiment of the disclosure.

Figure 8A:
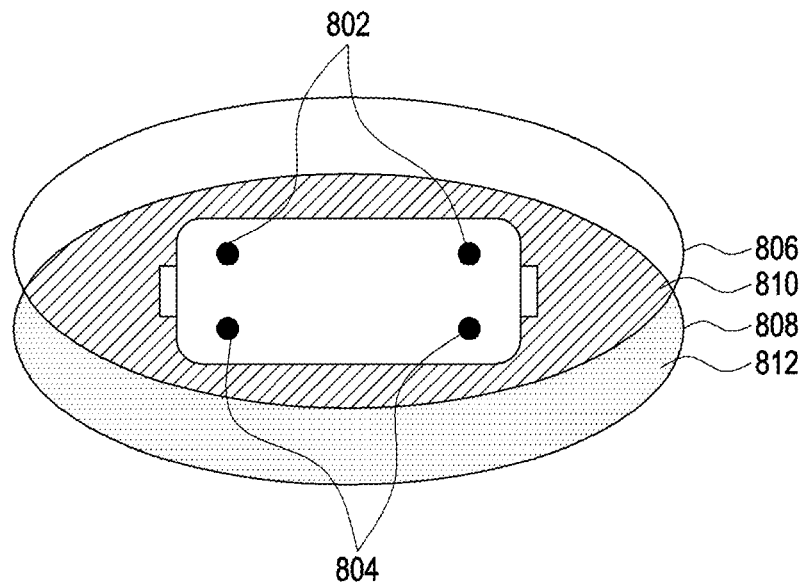
FIG. 8A illustrates a schematic representation depicting a front view of an electronic device implementing the system, according to an embodiment of the disclosure.
Figure 8B:
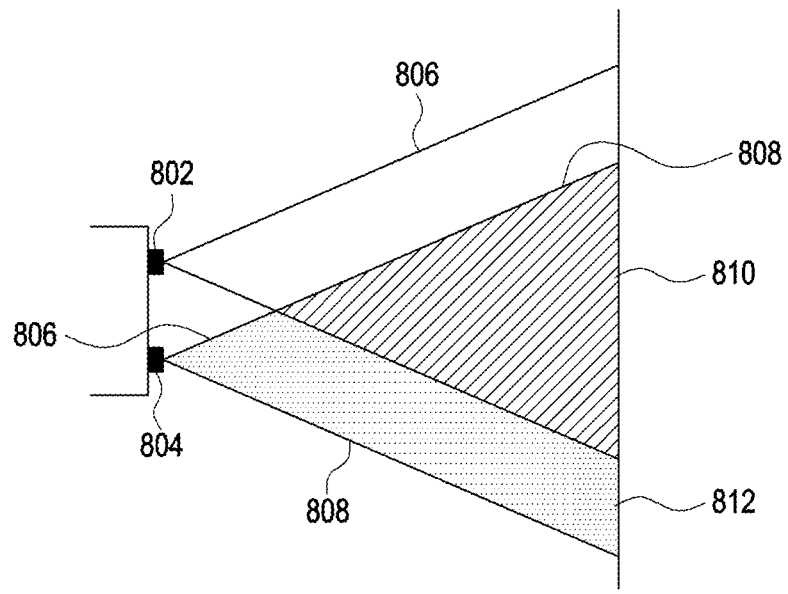
FIG. 8B illustrates a schematic representation depicting a cross-sectional view of an electronic device implementing the system, according to an embodiment of the disclosure.

FIG. 8B illustrates a schematic representation depicting a cross-sectional view of an electronic device implementing the system 200, according to an embodiment of the disclosure. For the sake of brevity, FIGS. 8A and 8B have been explained together. The details on correcting the mapping drift by the system 200 have been explained in detail with reference to FIG. 3.

Referring to FIGS. 8A and 8B, one or more primary cameras 802, i.e., the one or more SLAM cameras, one or more secondary cameras 804, i.e., the one or more hand tracking cameras, a Field of View (FoV) 806 of the one or more SLAM cameras 802, a FoV 808 of the one or more hand tracking cameras 804, an overlapping FoV 810 of the one or more SLAM cameras 802 and the one or more hand tracking cameras 804, and an additional FoV 812 of the one or more hand tracking cameras 804.

In an embodiment of the disclosure, larger overlapping FoV 810 between the one or more SLAM cameras 802 and the one or more hand tracking cameras 804 helps in extracting robust feature matches with the parallel map/secondary map generated by the one or more hand tracking cameras 804 which are reinitialized periodically. This helps in correcting the mapping drift continuously without having to revisit previously mapped regions. Further, the one or more hand tracking cameras also provide additional previously unseen FoV 812 which helps in detecting new key points resulting in robust and accurate tracking. This prevents monotonic drift accumulation.

Figure 9:
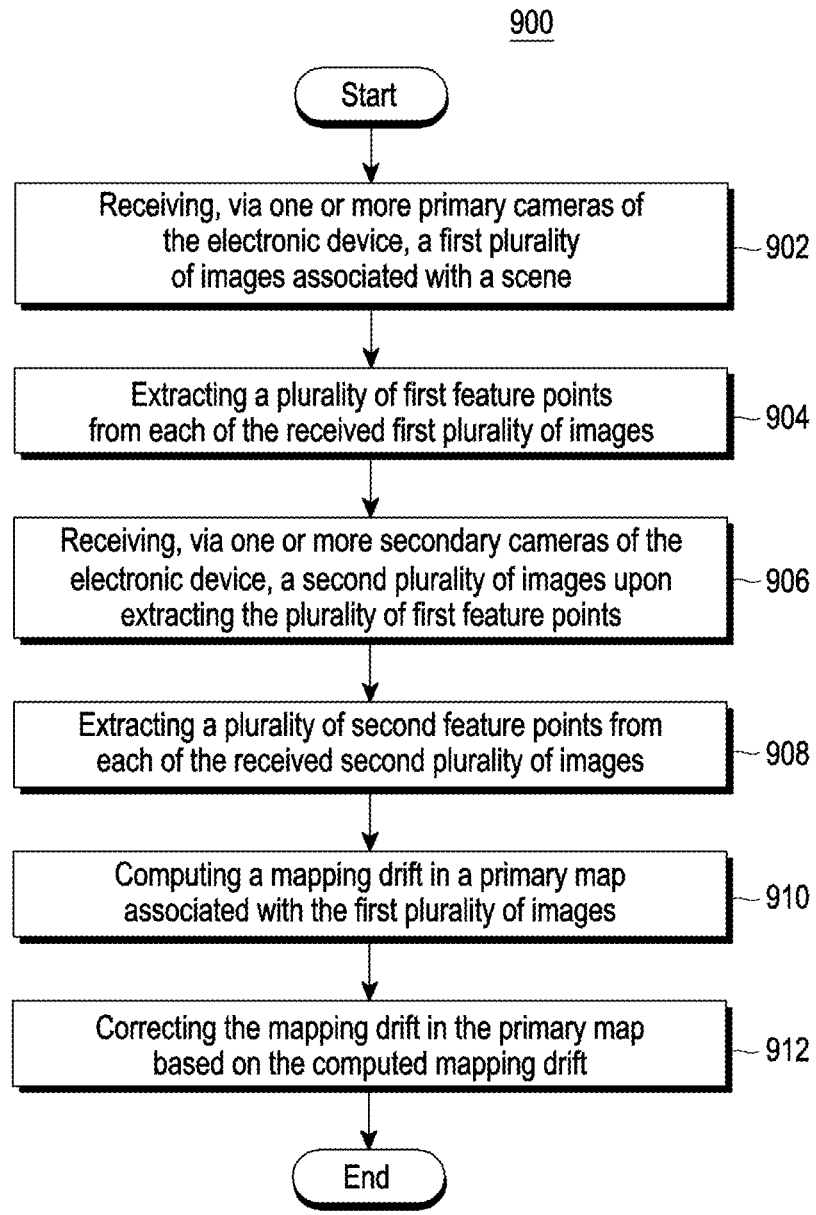
FIG. 9 illustrates a process flow depicting a method for correcting the mapping drift in the electronic device, according to an embodiment of the disclosure.

FIG. 9 illustrates a process flow depicting a method for correcting the mapping drift in an electronic device, according to an embodiment of the disclosure.

Referring to FIG. 9, a method 900 may be performed by the system 200 implemented in the electronic device 202, as shown in FIGS. 2 and 3.

At operation 902, the method 900 includes receiving, via one or more primary cameras 216 of the electronic device 202, the first plurality of images associated with the scene. In an embodiment of the disclosure, the one or more primary cameras 216 are one or more Simultaneous Localization and Mapping (SLAM) cameras.

At operation 904, the method 900 includes extracting the plurality of first feature points from each of the received first plurality of images.

At operation 906, the method 900 includes receiving, via one or more secondary cameras 218 of the electronic device 202, the second plurality of images upon extracting the plurality of first feature points. In an embodiment of the disclosure, the one or more secondary cameras 218 are one or more hand tracking cameras.

Further, at operation 908, the method 900 includes extracting the plurality of second feature points from each of the received second plurality of images. In an embodiment of the disclosure, a field of view of the one or more secondary cameras 218 overlaps with a field of view of the one or more primary cameras 216.

At operation 910, the method 900 includes computing a mapping drift in a primary map associated with the first plurality of images by comparing the position coordinates of the extracted plurality of first feature points with the position coordinates of the extracted plurality of second feature points.

At operation 912, the method 900 includes correcting the mapping drift in the primary map based on the computed mapping drift.

While the above steps shown in FIG. 9 are described in a particular sequence, the steps may occur in variations to the sequence in accordance with various embodiments of the disclosure. Further, the details related to various steps of FIG. 9, which are already covered in the description related to FIGS. 2, 3, 4A, 4B, 5 to 7, 8A, and 8B are not discussed again in detail here for the sake of brevity.

Figure 10:
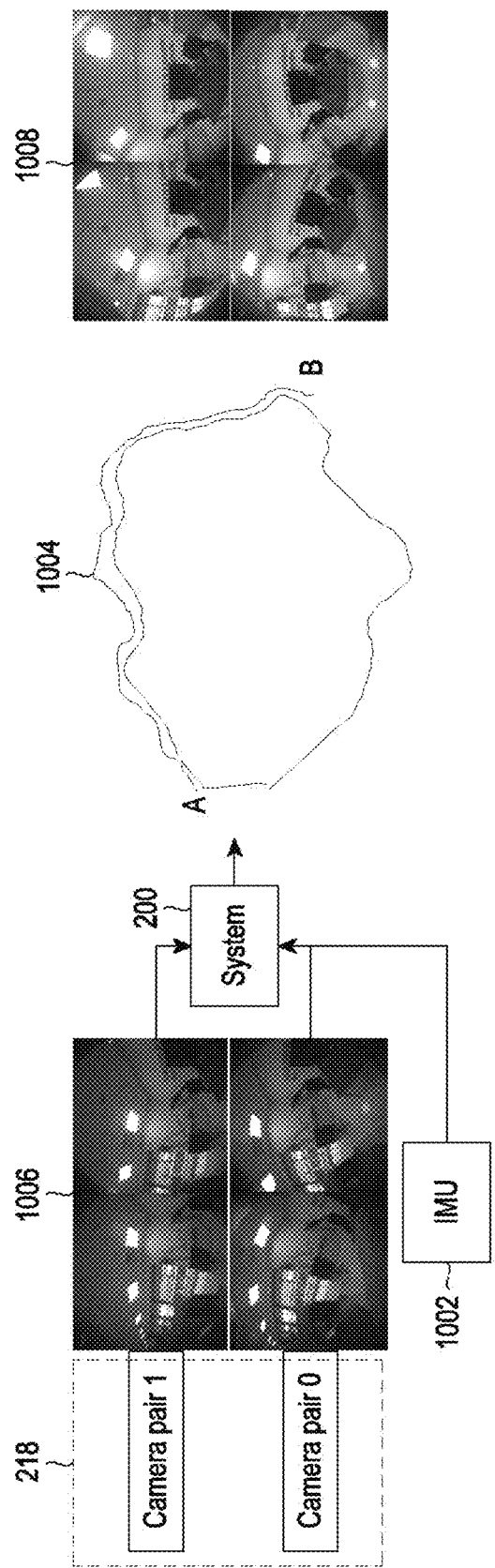
FIG. 10 illustrates a schematic representation depicting a use-case scenario for correcting the mapping drift, according to an embodiment of the disclosure.

FIG. 10 illustrates a schematic representation depicting a use-case scenario for correcting the mapping drift, according to an embodiment of the disclosure. The details on correcting the mapping drift by the system 200 have been explained in detail with reference to FIG. 3.

Referring to FIG. 10, one or more secondary cameras 218 and an IMU 1002 are illustrated. In an embodiment of the disclosure, the system 200 uses the one or more secondary cameras 218 as input to re-initialize the parallel tracker. The system 200 uses the inputs from the one or more secondary cameras 218 and the IMU 1002 for correcting the drift error in the primary, at step 1004. This effectively minimizes drift without the user having to revisit previously tracked region (Point A). This helps in providing a better user experience where the user need not be asked to come back to the place from where the tracking started. The first plurality of images with drift error 1006 is illustrated. Further, the images with no drift error 1008 after step 1004 are illustrated.

Further, the system uses multiple cameras with minimal overlap to enable the addition of new previously unseen landmarks thereby enabling a more robust and accurate tracking in environments with dynamic objects, lighting changes, and the like.

The disclosure provides for various technical advancements based on the key features discussed above. The disclosure uses independent tracking information from the multiple overlapping cameras on an AR headset to continuously match with mapped points [close the loop thereby minimizing the drift in AR headsets. The head mounted display (HMD) of the disclosure has multiple cameras which are looking at the same scene. The disclosure runs independent tracking instances on each camera and later merges the information into a single map to provide minimal drift tracking without waiting for the user to manually close the loop. Usage of independent multi camera tracking with loop closure constraints also helps in adding more landmarks to the map which were previously not visible from just a single camera's field of view. This also helps in tracking scenes in the presence of dynamic objects in the scene.

Further, the disclosure facilitates the interaction of the user with virtual objects or other users in a virtual or augmented scenario by accurately estimating head movement along with the estimation of the user's motion in the scene. The disclosure uses a SLAM with minimal drift for any AR/VR headset for a smooth immersive user experience. The disclosure continues drift correction dynamically with the help of additional map points contributed by a parallel tracker. This enables correct drift on the go without even re-visiting the same point in 3D-space or even loop not completed as in the conventional methods. Hence, the user can enjoy covering longer paths with accurate and smooth interactions with 3D space as drift gets corrected dynamically. The proposed disclosure makes the interaction in metaverse or with other virtual or augmented objects seamless with minimal drift and best accuracy which is a requirement for seamless user experience. Usually drift/error keeps accumulating if the user is covering a long path and not re-visiting previously seen space. Further, the proposed disclosure addresses this quite effectively.

The plurality of modules 208 may be implemented by any suitable hardware and/or set of instructions. Further, the sequential flow illustrated in FIG. 9 is exemplary and the embodiments may include the addition/omission of steps as per the requirement. In some embodiments, the one or more operations performed by the plurality of modules 208 may be performed by the processor/controller based on the requirement.

Figure 11A:
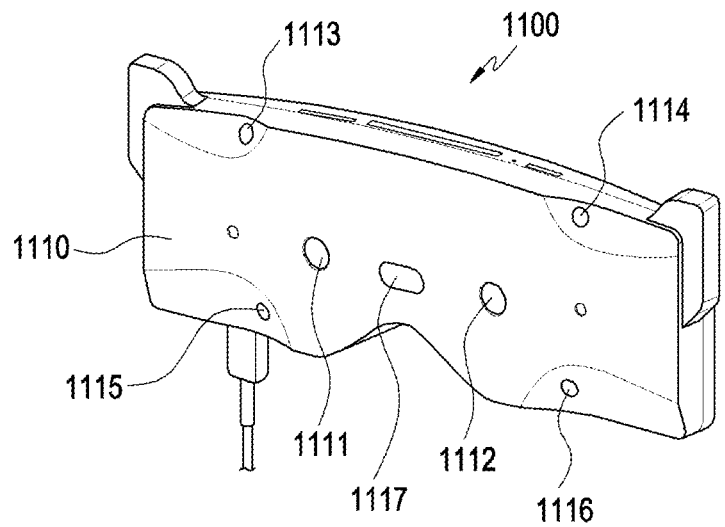
FIGS. 11A and 11B are diagrams illustrating a wearable device (e.g., the electronic device or the system) according to various embodiments of the disclosure.
Figure 11B:
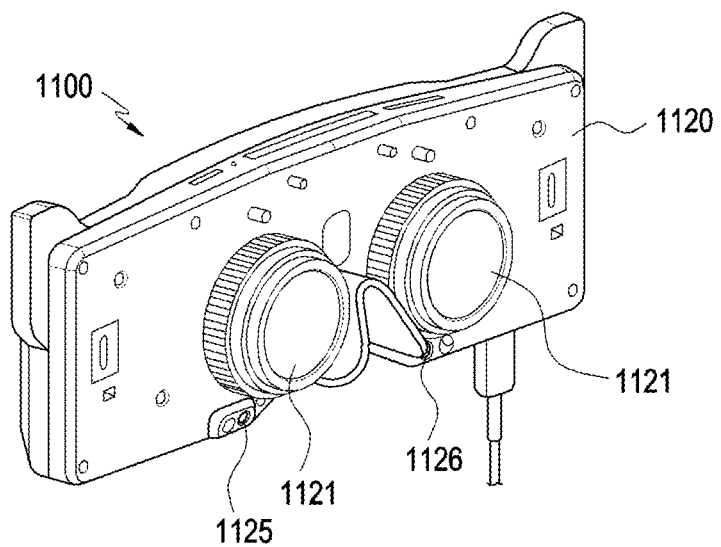

FIGS. 11A and 11B are diagrams illustrating a wearable device 1100 (e.g., the electronic device 202 or the system 200) according to various embodiments of the disclosure.

Referring to FIGS. 11A and 11B, in an embodiment, camera modules 1111, 1112, 1113, 1114, 1115, and 1116 and/or a depth sensor 1117 for obtaining information related to the surrounding environment of the wearable device 1100 may be disposed on a first surface 1111 of the housing. In an embodiment, the camera modules 1111 and 1112 may obtain an image related to the surrounding environment of the wearable device. In an embodiment, the camera modules 1113, 1114, 1115, and 1116 may obtain an image while the wearable device is worn by the user. Images obtained through the camera modules 1113, 1114, 1115, and 1116 may be used for simultaneous localization and mapping (SLAM), 6 degrees of freedom (6DoF), 3 degrees of freedom (3DoF), subject recognition and/or tracking, and may be used as an input of the wearable electronic device by recognizing and/or tracking the user's hand. In an embodiment, the depth sensor 1117 may be configured to transmit a signal and receive a signal reflected from a subject, and may be used to identify the distance to an object, such as time of flight (TOF). According to an embodiment, face recognition camera modules 1125 and 1126 and/or a display 1121 (and/or a lens) may be disposed on the second surface 1120 of the housing. In an embodiment, the face recognition camera modules 1125 and 1126 adjacent to the display may be used for recognizing a user's face or may recognize and/or track both eyes of the user. In an embodiment, the display 1121 (and/or lens) may be disposed on the second surface 1120 of the wearable device 200. In an embodiment, the wearable device may not include the camera modules 1115 and 1116 among a plurality of camera modules 1113, 1114, 1115, and 1116. As described above, the wearable device according to an embodiment may have a form factor for being worn on the user's head. The wearable device may further include a strap for being fixed on the user's body and/or a wearing member (e.g., the wearing member 203). The wearable device may provide a user experience based on augmented reality, virtual reality, and/or mixed reality within a state worn on the user's head.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for correcting a mapping drift, the method comprising:
   receiving, by the electronic device via one or more primary cameras of the electronic device, a first plurality of images associated with a scene;
   extracting, by the electronic device, a plurality of first feature points from each of the received first plurality of images;
   receiving, by the electronic device via one or more secondary cameras of the electronic device, a second plurality of images upon extracting the plurality of first feature points;
   extracting, by the electronic device, a plurality of second feature points from each of the received second plurality of images, wherein a field of view of the one or more secondary cameras overlaps with a field of view of the one or more primary cameras;

computing, by the electronic device, a mapping drift in a primary map associated with the first plurality of images by comparing position coordinates of the extracted plurality of first feature points with position coordinates of the extracted plurality of second feature points; and correcting, by the electronic device, the mapping drift in the primary map based on the computed mapping drift.

2. The method of claim 1, further comprising:
generating the primary map based on the received first plurality of images.

3. The method of claim 1, further comprising:
generating a secondary map based on the received second plurality of images.

4. The method of claim 1, wherein computing the mapping drift in the primary map comprises:
identifying a first relation based on comparison of a first set of two-dimensional (2D) position coordinates of the extracted plurality of first feature points with a second set of 2D position coordinates of the extracted plurality of second feature points;
identifying a second relation between a first set of three-dimensional (3D) position coordinates of the extracted plurality of first feature points and a second set of 3D position coordinates of the extracted plurality of second feature points based on the first relation;
calculating a difference between the first set of 3D position coordinates and the second set of 3D position coordinates based on the second relation; and
computing the mapping drift in the primary map based on the calculated difference between the first set of 3D position coordinates and the second set of 3D position coordinates.

5. The method of claim 4,
wherein correcting the mapping drift in the primary map comprises:
updating, for correcting the mapping drift in the primary map, the position of the first set of 3D position coordinates based on the position of the second set of 3D position coordinates and the computed mapping drift in the primary map, and
wherein the mapping drift is corrected for each of the first plurality of images.

6. The method of claim 1, further comprising:
receiving, via the one or more secondary cameras, a plurality of additional images associated with the scene, wherein the plurality of additional images are other than the first plurality of images associated with the scene;
extracting a plurality of additional feature points from each of the received plurality of additional images; and
computing a mapping drift in the primary map associated with the first plurality of images by comparing position coordinates of the extracted plurality of first feature points with position coordinates of the extracted plurality of second feature points and the extracted plurality of additional images.

7. An electronic device for correcting a mapping drift, the electronic device comprising:
one or more primary cameras;
memory storing one or more computer programs; and
one or more processors communicably coupled to the one or more primary cameras and the memory,
wherein the one or more computer programs include computer-executable instructions that, when executed by the one or more processors individually or collectively, cause the electronic device to:
receive, via the one or more primary cameras, a first plurality of images associated with a scene,
extract a plurality of first feature points from each of the received first plurality of images,
receive, via one or more secondary cameras, a second plurality of images upon extracting the plurality of first feature points,
extract a plurality of second feature points from each of the received second plurality of images, a field of view of the one or more secondary cameras overlaps with a field of view of the one or more primary cameras,
compute a mapping drift in a primary map associated with the first plurality of images by comparing position coordinates of the extracted plurality of first feature points with position coordinates of the extracted plurality of second feature points, and
correct the mapping drift in the primary map based on the computed mapping drift.

8. The electronic device of claim 7, wherein the one or more computer programs further include computer-executable instructions that, when executed by the one or more processors individually or collectively, cause the electronic device to:
generate the primary map based on the received first plurality of images.

9. The electronic device of claim 7, wherein the one or more computer programs further include computer-executable instructions that, when executed by the one or more processors individually or collectively, cause the electronic device to:
generate a secondary map based on the received second plurality of images.

10. The electronic device of claim 7, wherein in computing the mapping drift in the primary map, the one or more computer programs further include computer-executable instructions that, when executed by the one or more processors individually or collectively, cause the electronic device to:
identify a first relation based on comparison of a first set of two-dimensional (2D) position coordinates of the extracted plurality of first feature points with a second set of 2D position coordinates of the extracted plurality of second feature points;
identify a second relation between a first set of three-dimensional (3D) position coordinates of the extracted plurality of first feature points and a second set of 3D position coordinates of the extracted plurality of second feature points based on the first relation;
calculate a difference between the first set of 3D position coordinates and the second set of 3D position coordinates based on the second relation; and
compute the mapping drift in the primary map based on the calculated difference between the first set of 3D position coordinates and the second set of 3D position coordinates.

11. The electronic device of claim 10,
wherein in correcting the mapping drift in the primary map, the one or more computer programs further include computer-executable instructions that, when executed by the one or more processors individually or collectively, cause the electronic device to:
update, for correcting the mapping drift in the primary map, the position of the first set of 3D position coordinates based on the position of the second set of 3D position coordinates and the computed mapping drift in the primary map, and wherein the mapping drift is corrected for each of the first plurality of images.

12. The electronic device of claim 7, wherein the one or more secondary cameras are reinitialized periodically for the scene.

13. The electronic device of claim 7, wherein the one or more primary cameras are one or more simultaneous localization and mapping (SLAM) cameras.

14. The electronic device of claim 7, wherein the one or more secondary cameras are one or more hand tracking cameras.

15. The electronic device of claim 7, wherein the one or more computer programs further include computer-executable instructions that, when executed by the one or more processors individually or collectively, cause the electronic device to:

receive, via the one or more secondary cameras, a plurality of additional images associated with the scene, wherein the plurality of additional images are other than the first plurality of images associated with the scene;

extract a plurality of additional feature points from each of the received plurality of additional images; and compute a mapping drift in the primary map associated with the first plurality of images by comparing position coordinates of the extracted plurality of first feature points with position coordinates of the extracted plurality of second feature points and the extracted plurality of additional images.

16. The electronic device of claim 7, wherein the one or more computer programs further include computer-executable instructions that, when executed by the one or more processors individually or collectively, cause the electronic device to:

before receiving the first plurality of images and the second plurality of images, estimate an initial state of a pair of visual inertial sensors.

17. The electronic device of claim 16, wherein the estimation of the initial state of the pair of visual inertial sensors estimate velocity, gravity and bias of a gyroscope and an accelerometer.

18. The electronic device of claim 17, wherein an inertial measurement unit (IMU) provides instantaneous angular velocity and linear acceleration of the electronic device.

19. One or more non-transitory computer-readable storage media storing one or more computer programs including computer-executable instructions that, when executed by one or more processors of an electronic device individually or collectively, cause the electronic device to perform operations, the operations comprising:

receiving, by the electronic device via one or more primary cameras, a first plurality of images associated with a scene;

extracting, by the electronic device, a plurality of first feature points from each of the received first plurality of images;

receiving by the electronic device, via one or more secondary cameras of the electronic device, a second plurality of images upon extracting the plurality of first feature points;

extracting, by the electronic device, a plurality of second feature points from each of the received second plurality of images, wherein a field of view of the one or more secondary cameras overlaps with a field of view of the one or more primary cameras;

computing, by the electronic device, a mapping drift in a primary map associated with the first plurality of images by comparing position coordinates of the extracted plurality of first feature points with position coordinates of the extracted plurality of second feature points; and correcting, by the electronic device, the mapping drift in the primary map based on the computed mapping drift.

20. The one or more non-transitory computer-readable storage media of claim 19, the operations further comprising:

generating the primary map based on the received first plurality of images; and generating a secondary map based on the received second plurality of images.

* * * * *